UNITED STATES PATENT OFFICE.

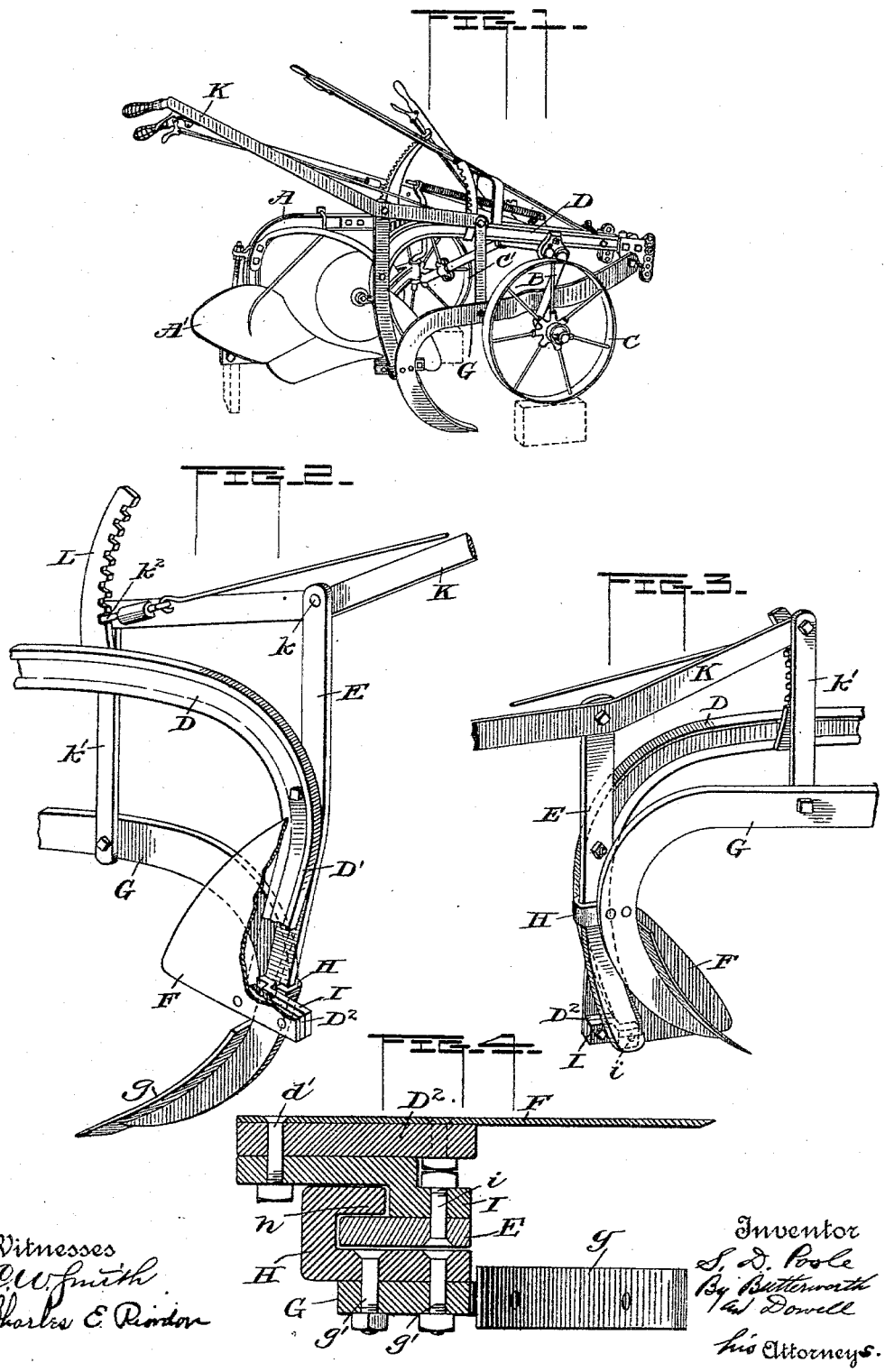

STALEY D. POOLE, OF MOLINE, ILLINOIS, ASSIGNOR TO THE DEERE & COMPANY, OF SAME PLACE.

SUBSOIL ATTACHMENT FOR GANG-PLOWS.

SPECIFICATION forming part of Letters Patent No. 545,170, dated August 27, 1895.

Application filed June 19, 1895. Serial No. 553,345. (No model.)

*To all whom it may concern:*

Be it known that I, STALEY D. POOLE, a citizen of the United States, residing at Moline, in the county of Rock Island and State of Illinois, have invented certain new and useful Improvements in Subsoil Attachments for Gang-Plows; and I do hereby declare the following to be a full, clear, and exact description of the invention, such as will enable others skilled in the art to which it appertains to make and use the same.

This invention relates to subsoil attachments to plows, but more particularly to attachments to that class of plows known in the art as "wheel" or "gang" plows.

The primary object of the invention is to provide an improved subsoil attachment for a gang-plow designed especially to run in the furrow made by a preceding plow, or the last furrow made by the rear plow of a gang in a preceding round, for the purpose of stirring up the subsoil ground and putting it in a spongy condition, so that it will store up the moisture, which in dry weather will be drawn up by the roots of the plants, while in wet weather the water, instead of running off, will sink down into the spongy earth, where it will be retained to afford nourishment to the plants during the dry season.

The invention is particularly adapted for use in beet culture, or in the cultivation of similar vegetables, for the purpose of loosening the soil and stirring up the ground, so as to permit the beet-roots to easily penetrate the soil and to facilitate the growth of such vegetables. I do not, however, desire to limit the application of the invention to any particular use or to any specific arrangement of plows, nor to any definite number employed in a gang, inasmuch as it is capable of being used, with one or more plows of a gang and in various relations. If only a single plow is used the subsoil attachment may be arranged to run in the furrow made on the preceding round, so as to penetrate the soil below the depth of cut of the plow. If two or more plows are used, the subsoil attachment may be arranged to run in the last furrow made by the last plow of the gang in the preceding round—that is, the last preceding furrow made by the gang of plows.

In the accompanying drawings, forming a part of this specification, in which the invention is illustrated as applied to a wheel or gang plow, Figure 1 represents a perspective view of a gang-plow with my improved subsoil attachment applied thereto. Fig. 2 is a detail perspective view from the rear of the subsoil attachment detached, showing parts broken away in order to more clearly illustrate the construction, the subsoil-plow being arranged in its lowermost position. Fig. 3 is a detail perspective view of the same parts from the opposite side, showing the subsoil-plow raised; and Fig. 4 is a detail sectional view illustrating the method of coupling the subsoil-plow to the upright bar or standard so as to permit it to be raised and lowered and secured at different elevations.

Similar letters of reference are used to denote similar parts in each of the several views.

A may denote a plow-beam of ordinary construction having any suitable plow, as A', as attached thereto, and B an ordinary crank-axle upon which may be journaled the wheels C C', provided with the usual or any suitable means for shifting the positions of the axle and plow beams, respectively, in a manner well known to those skilled in the art for the purpose of changing the inclination of the plow and varying the depth of penetration thereof in the usual manner. Such parts, however, do not form any part of my present invention, and may be of the form shown or any preferred construction, so that it is not deemed necessary to further describe the same herein.

D may denote a curved beam or frame-bar mounted upon the frame or rigidly secured thereto at its forward end and having at its rear end a depending portion D', to which is secured a slightly curved upright or standard E for a purpose to be described. The beam or frame-bar D carries at its lower end a fin-cutter F, which may be secured to the inside of the beam by means of countersunk bolts or otherwise in such manner as to take the place of the ordinary landside of the usual plow-bottom. This cutter may be of the triangular form shown or any preferred construction, and may be provided with a series of perforations to permit of longitudinal or vertical adjustment to adapt it to various requirements in use.

G denotes a curved bar or beam suitably pivoted at its forward end to a pendent bracket or other fixture secured to the frame or beam D. This beam carries at its rear end a subsoil-plow, the blade $g$ of which is preferably in the form of a wedge, or it may consist of an ordinary shovel-blade or bull-tongue secured to the lower curved end of the beam, or the beam may be formed integrally with a blade or shaped to perform the functions of a subsoil-plow. To adapt the rear end of the beam G to be raised and lowered for the purpose of varying the depth of penetration of the plow formed thereon or carried thereby, it is loosely coupled to the upright or standard E in any proper manner, so as to permit the plow to be raised and lowered and held in different positions relatively to the cutter F. The coupling which I have devised for this purpose, and which is illustrated more clearly in Figs. 2 and 4 of the drawings, consists of an L-shaped piece or casting H, adapted to fit partially around and slide up and down the standard E, and an angular piece I connecting said standard with the beam D. Said piece H has its longer arm secured preferably by means of countersunk bolts $g'$ $g'$ to the rear end of the subsoil-plow beam G, while the piece I has one arm secured to the standard E by means of a countersunk bolt $i$, and its other arm secured to the frame piece or beam D by means of a countersunk bolt $d'$, though, of course, other securing means may be employed. The rear arm of the angular piece or bracket I is arranged to overlap the shorter arm $h$ of the L-shaped piece H, so as to confine the subsoil-plow beam to the standard and permit the same to be raised and lowered and secured in any desired position by suitable means for that purpose.

For adjusting and controlling the subsoil-plow a hand-lever K may be pivoted, as at $k$, to the upper end of the standard E and connected at its forward end with the subsoil-plow beam G by a suitable link $k'$, being also provided with a pawl or dog $k^2$ of the usual spring-pressed or any preferred construction, connected in the usual manner to an ordinary pawl-operating lever or bell-crank pivoted to the rear end of the hand-lever K, said pawl or dog being arranged to engage a notched bar or rack L, mounted upon the frame or beam D in any proper manner, whereby when the rear end of the lever K is lowered the subsoil-plow will be raised, and vice versa; but other means may be employed for raising and lowering the subsoil-plow attachment. The fin-cutter F is adapted to run along beside the landside portion of the furrow last made, taking the place of the usual landside or landside-bar of an ordinary plow, while the subsoil-plow penetrates the bottom of the furrow to a depth below the depth of cut of the plow by which the furrows are formed, said cutter being adapted as it runs along the inside of the open furrow to form a cutting-edge in case the beam to which it is attached should run a little too much to land, which results when the horses get out of line and from other causes.

The subsoil-plow is shown in an elevated position in Fig. 3, and the two parts in this position are adapted to operate after the manner of an ordinary shovel-plow having a landside-cutter, while in any intermediate position of the subsoil-plow between the two extremes represented in Figs. 2 and 3 (being shown in its lowest position in Fig. 2 and in its highest in Fig. 3) the subsoil attachment will penetrate to a depth below the foot of the fin-cutter or beam to which it is attached proportionate to the distance it may be adjusted below the position indicated in Fig. 3.

The standard E should be formed upon the arc of a circle having its center in the pivot of the front end of the subsoil-beam, so that the latter may be raised and lowered without causing the coupling or connection between the same and the standard to bind. I do not, however, desire to be limited to this special construction, nor to the form of coupling shown, nor to the particular arrangement of parts described and shown, as other forms may be substituted with equally good results.

The subsoil attachment may be applied to an ordinary-gang plow by simply removing the usual plow-bottom on the forward beam and securing the subsoil attachment in its place.

Having thus fully described my invention, what I claim as new, and desire to secure by Letters Patent of the United States, is—

1. In combination with the wheeled frame and gang plow or plows, the sub-soil plow having its beam pivoted at its forward end so as to permit the plow to be raised and lowered, a frame-bar or beam having a depending portion provided with a vertically disposed cutter arranged to work in proximity to said subsoil plow, means for coupling the rear portion of said sub-soil plow-beam to said cutter-supporting beam, and means for adjusting said sub-soil plow and securing the same in different positions relatively to said cutter, substantially as described.

2. In a gang plow, the combination with the wheeled frame and plows, of a sub-soil plow having its supporting beam pivoted at its forward end to a fixture upon the frame, a frame-bar or beam having a depending portion loosely coupled to the rear end of said subsoil plow beam so as to adapt the sub-soil plow to be raised and lowered, a vertically disposed cutting blade secured to said pendent portion of said frame-bar or beam, and means for raising and lowering and securing said sub-soil plow at different elevations, substantially as described.

3. In a gang plow the combination with the plow-frame and plows, of the frame-bar or beam having a depending portion provided with a fin cutter, and having an upright bar or standard rigidly secured thereto, a sub-soil plow beam pivoted at its forward end to said frame or beam and loosely coupled at its rear end to said standard, so that it may be raised and lowered relatively thereto, and means for raising and lowering said sub-soil plow and securing the same in the desired position, substantially as described.

4. In a gang plow, the combination with the wheeled frame and plows, of the frame-bar or beam having a pendent curved portion with a cutter secured thereto, the sub-soil plow-beam pivoted at its forward end and provided at its rear end with a sub-soil plow, the coupling uniting said cutter-supporting beam and sub-soil plow-beam so as to permit the latter to be raised and lowered relatively to the former, and means for raising and lowering said sub-soil plow-beam and securing the same in the desired position, comprising a hand-lever pivotally mounted on said cutter-supporting beam, a rack fixed to said beam, a pawl on said hand-lever engaging said rack, a pawl-operating lever, and a link pivotally connecting one arm of said lever with the sub-soil plow beam, substantially as described.

5. In a gang plow, the combination with the plow frame and plows, of the curved frame-bar or beam carrying a vertically disposed cutter at its lower rear end arranged to run along the inside of the furrow last made, taking the place of the landside-bar of the ordinary plow, and adapted at the same time to form a cutting edge, the sub-soil plow-beam pivoted at its forward end and loosely coupled at its rear end to said frame-bar so as to be readily raised and lowered and secured in different positions relatively to said cutter, and means for raising and lowering said sub-soil plow and securing the same in the desired position, substantially as described.

6. In combination with a frame-bar or beam provided at its rear end with a vertically disposed cutter and with an upright or standard, of a sub-soil plow beam pivoted at its front end and carrying at its rear end a sub-soil plow arranged to work at one side of said cutter, and means for coupling said parts, comprising an L-shaped coupling-piece having one arm secured to said sub-soil plow beam and arranged to partially surround and embrace said standard so as to slide up and down the same, and an angular coupling-piece connecting said cutter-supporting beam and standard; one of the arms of the angular piece overlapping the shorter arm of the L-shaped coupling-piece, substantially as described.

In testimony whereof I affix my signature in presence of two witnesses.

STALEY D. POOLE.

Witnesses:
FRED H. COOPER,
JOHN GALT.